Patented June 7, 1927.

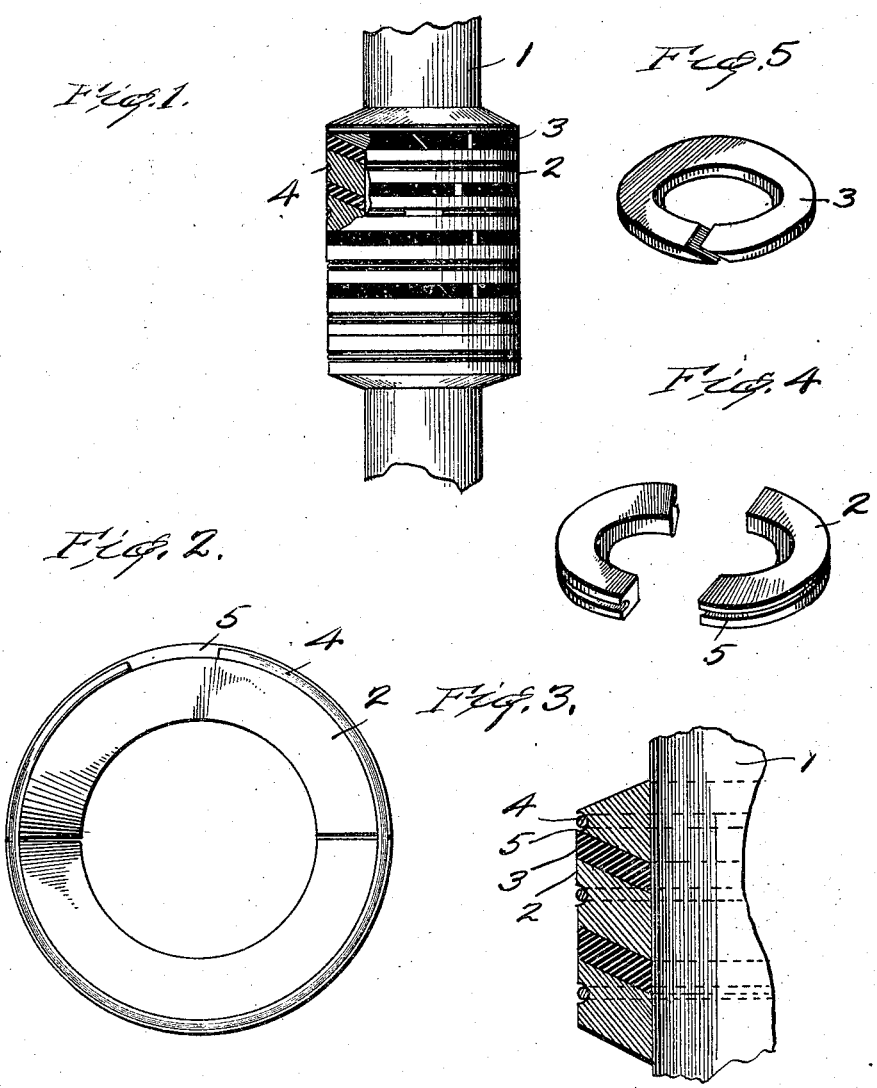

1,631,520

UNITED STATES PATENT OFFICE.

JOHN L. CREEVY, OF NEW ORLEANS, LOUISIANA.

PACKING.

Application filed March 29, 1923. Serial No. 628,610.

The present invention relates to packing for steam, gas, or air on piston rods, valve stems or revolving shafts, where packing is required and the principal object of the invention is to provide a self-adjusting packing which will be efficient and reliable in use.

With the above and numerous other objects in view as will appear as the description progresses, the invention resides in certain novel features of construction, and in the combination and arrangement of parts as will be hereinafter more fully described and claimed.

In the drawing:—

Figure 1 is an elevation of the packing showing the same on a rod and portions thereof in section, Figure 2 is an end view of the packing, Figure 3 is a detail section through the packing, Figure 4 is a perspective of one of the Babbitt rings, and Figure 5 is a perspective of one of the yieldable rings.

Referring to the drawing in detail it will be seen that 1 designates a rod upon which the packing is mounted. This packing includes a plurality of Babbitt metal rings 2 which are dished or so shaped that a cross section therethrough forms a parallelogram the faces of which extend at an angle of approximately 15° to the outer surface. This is true of all of the Babbitt metal rings except the end ones which are formed in accordance with the shape of the stuffing box. There is a plurality of pure gum rings 3 or of some other suitable yieldable material and of suitable thickness disposed between the Babbitt metal rings to take care of the expansion and contraction of the entire set of packing and to prevent its being injured if the gland be set tighter than required. The Babbitt rings are cut in half so as to be formed of two segments as shown in Figure 4 which are held together by a resilient ring 4 which is seated in a groove 5 provided in the rings 2 on the exterior surface thereof.

As is clearly shown in Figure 3 the plane of compression of each ring 4 passes through the dished or depressed face of the ring 2 which it encircles, acting to compress this depressed face against the adjacent gum ring.

Having thus described my invention what I claim as new is:—

A packing of the character described, comprising a pair of spaced end rings surrounding a piston rod, a plurality of dished split rings arranged in spaced relation about said rod, each of said rings having a groove formed about the periphery thereof, resilient packing between the separate rings, and an annular binding element surrounding each of the rings and lying in the grooves thereof to hold the rings in position, the plane of compression of the binding element surrounding each of the dished rings, passing through the depressed face of the ring at the inner edge thereof, to cause the ring to be compressed against the resilient packing lying against the depressed face thereof.

In testimony whereof I affix my signature.

JOHN L. CREEVY.